D. L. NEWTON.
APPARATUS FOR DETERMINING THE AMOUNT OF GASOLENE CARRIED IN CASING GAS.
APPLICATION FILED SEPT. 9, 1919.
1,330,490.
Patented Feb. 10, 1920.
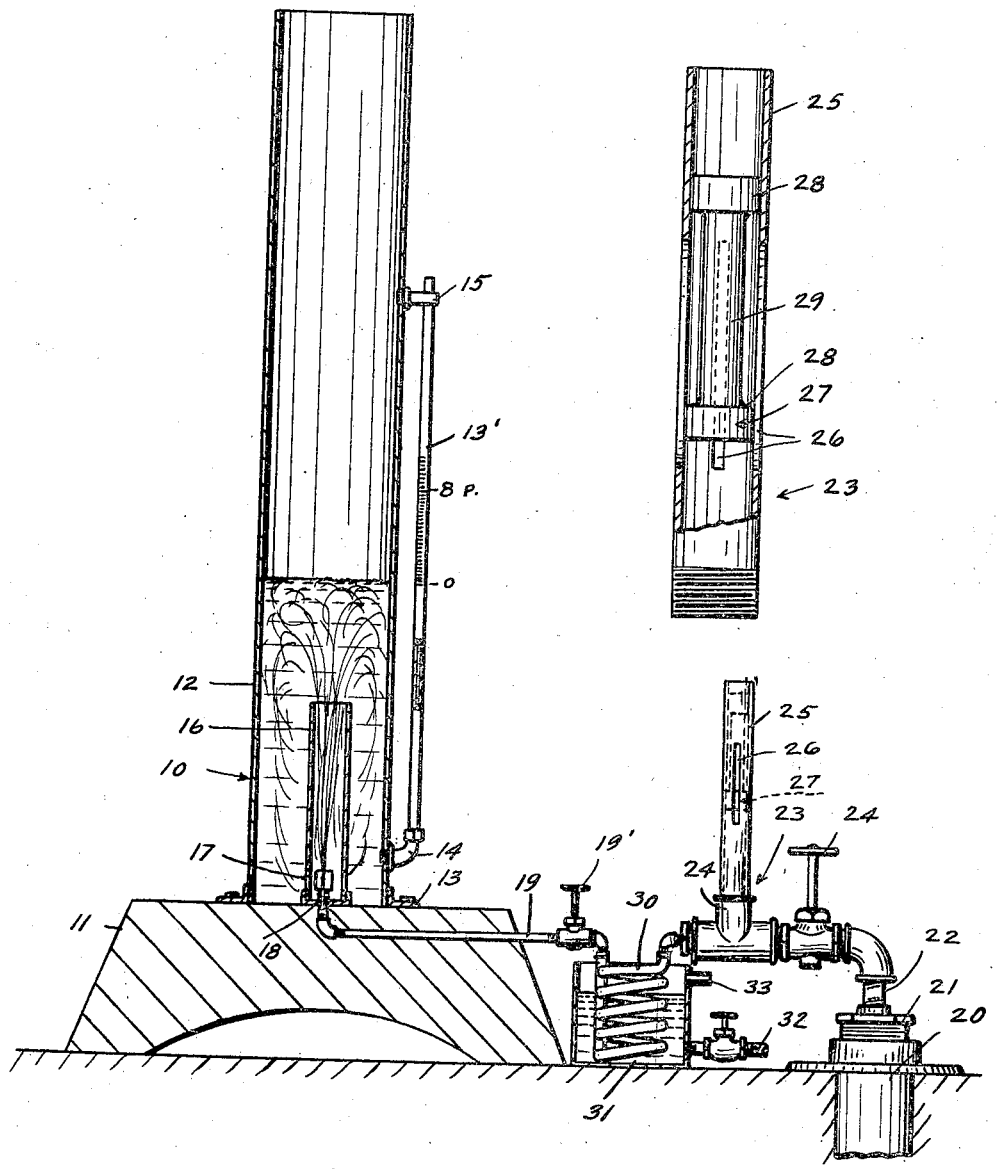
INVENTOR.
D. L. Newton,
BY Hazard & Miller
ATTORNEYS.

UNITED STATES PATENT OFFICE.

DANIEL L. NEWTON, OF LOS ANGELES, CALIFORNIA.

APPARATUS FOR DETERMINING THE AMOUNT OF GASOLENE CARRIED IN CASING-GAS.

1,330,490.   Specification of Letters Patent.   Patented Feb. 10, 1920.

Application filed September 9, 1919. Serial No. 322,707.

*To all whom it may concern:*

Be it known that I, DANIEL L. NEWTON, a citizen of the United States, residing at Los Angeles, in the county of Los Angeles and State of California, have invented new and useful Improvements in Apparatus for Determining the Amount of Gasolene Carried in Casing-Gas, of which the following is a specification.
It is an object of this invention to provide an apparatus for determining the amount of gasolene carried in natural gas.

As well known, natural gas contains gasolene in varying amounts. The gasolene is extracted from the gas by various means such as condensers or absorption apparatus. In the latter the natural gas is made to contact intimately with an absorbing menstruum, such as hydrocarbon distillate, from which it is later recovered by suitable means.

It is desirable to ascertain from time to time the amount of gasolene contained in a certain volume of natural gas and there are devices whereby the percentage of gasolene carried by natural gas is determined. The objection to the devices now in use is that it requires considerable time to make the test and unless the same is carefully performed the results are unreliable. Furthermore, even when accurately made, the tests do not correspond with the amount of gasolene recovered by the commercial methods now in use.

The object of this invention is to provide a simple apparatus whereby a test can be quickly made without the necessity of careful manipulation and where the result of the test can be immediately read from the meter or gage of the apparatus. Furthermore, the principle of extraction employed in the device is the same as the commercial absorption method which is the one now in general use, so that the test corresponds very closely with the gasolene recovered in the plant.

My invention consists in the construction, combination and arrangement of parts hereinafter described and claimed.

In the accompanying drawings which form a part of this specification,

Figure 1 illustrates an elevation of my apparatus with parts in vertical cross section.

Fig. 2 is a vertical sectional view on an enlarged scale of the gas pressure regulator.
Referring to the drawings, 10 indicates the gasolene testing apparatus. The same consists of a suitable base 11, on which a vertical cylinder 12 is secured by means of a flange ring 13 bolted to the base 11. A graduated glass tube 13' is in communication with the lower end of the cylinder 10 by means of an elbow 14 tapped therein, the upper open end of the glass tube 13' being held by a bracket 15 mounted on the cylinder. A short upright cylindrical tube 16 of comparatively small diameter is mounted on the base 11 concentrically with the pipe 12 and is provided at its lower end with radial apertures 17. Tapped through the base 11 and terminating at the center of the mixing tube 16 is a gas nozzle 18 connected by means of a pipe 19 in communication with a gas casing 20. The gas casing 20 has a reducing bushing 21 from which a pipe 22 leads to a gas pressure regulator 23, 24 is a valve in the pipe 22 and 19' is a valve in the pipe 19 communicating with the gas pressure regulator 23. The function of the gas pressure regulator 23 is to reduce the gas pressure to a predetermined degree, and any other suitable gas pressure regulator may be substituted therefor. In the present case the gas pressure regulator 23 consists of a T connection 24, one horizontal end being connected with pipe 22, and the other end being connected with a coil of pipe or flexible hose 30 which is joined to pipe 19. In order to control the temperature of the gas I place the pipe or hose coil 30 in a water container 31 having a valved water inlet pipe 32 and an overflow pipe 33. The temperature of the gas may be easily controlled by controlling the cold water inlet to the tank 31.

In the vertical arm of the T connection 24 is a cylinder 25 screw threaded therein. The cylinder 25 is open at its upper end and provided intermediate its length with vertical slots 26. A plunger or gas float 27 having cylindrical heads 28 at opposite ends and a reduced intermediate portion 29 fits slidingly in the cylinder 25 and which, as the gas pressure exceeds a predetermined degree, uncovers the slots 26, thereby affording escape to the excessive gas pressure.

In the operation of the device the cylinder 12 is filled with a gasolene absorbing oil or hydrocarbon such as seal oil, which is a neutral mineral oil resembling kerosene, slightly yellowish, of 35° Bé., or any other low grade distillate. I prefer to take 125 c. c. of the absorbent oil and pour the same into the cylinder 10, after closing the valve 19′ in pipe 19 and I mark the level of the oil in the glass tube 13′. I next proceed to calibrate the device by passing casing gas, the gasolene content of which has been accurately determined by any preferred method, through the absorbing oil at a predetermined pressure, say 8½ inches of water pressure at a temperature of 80° F. for half an hour. The gas in leaving the nozzle 18 will bubble through the absorbent oil. The mixing tube 16 provided with perforations 17 will cause a circulation of the oil, thereby causing intimate contact of the gas with the absorbent menstruum.

It should be noted at this point that the agitation of the oil will cause the lighter hydrocarbons, such as pentane and butane, to volatilize and leave the oil so that the gasolene retained by the oil will correspond very closely to the gasolene retained by the absorbent menstruum in the plant.

It has been found that an increase in volume of 1 c. c. of the absorbent oil, due to the absorption of gasolene, corresponds to 1⅓ pints per thousand feet of gas.

Assuming that the gasolene content of the gas used by calibrating the tester contained 1 gallon or 8 pints of gasolene, the level of the oil in cylinder 10 will rise, which rise will correspond to the rise in the glass tube 13′. This point is marked as 8 pints and the glass tube between 8 pints and the mark zero is graduated to indicate points and fractions of points. The same graduations are extended above the point marked 8 pints.

The instrument being calibrated as just described, it is now ready for testing any other gas for its gasolene content, and all that is necessary is to place 125 c. c. of the absorbent oil into the cylinder 10 and to run the gas for the same period of time, 30 minutes, at the same pressure, 12½ inches, and at the same temperature, 80° F., or at least to read the gage with the temperature conditions of 80° F. and the amount of gasolene that may be recovered commercially is at once ascertained.

Various changes may be made in the combination, construction and arrangement of parts without departing from the spirit of my invention as claimed.

I claim:

1. A device for testing gas for gasolene, comprising a source of gas under pressure, a gas pressure regulator, means for conducting the gas to an open receptacle containing an absorbent liquid menstruum, means for mixing the gas with the menstruum, and means for indicating the increase in volume of said menstruum.

2. A device for testing gas for gasolene, comprising a source of gas under pressure, a gas pressure regulator, means for controlling the temperature of the gas, means for conducting the gas to an open receptacle containing an absorbent liquid menstruum, means for mixing the gas with the menstrum, and a graduated meter in communication with the receptacle for indicating the increase in volume of said menstruum.

3. A device for testing gas for gasolene, comprising a source of gas under pressure, a gas pressure regulator, means for controlling the temperature of the gas, means for conducting the gas to a tubular receptacle open at the top, a gas nozzle at the bottom of the receptacle, a vertical mixing tube having apertures at its lower end concentrically disposed in the receptacle, said gas nozzle being positioned at the center of the bottom of the mixing tube, and means for indicating the increase in volume of the absorbent menstruum in the receptacle.

In testimony whereof I have signed my name to this specification.

D. L. NEWTON.